(12) United States Patent
Flores et al.

(10) Patent No.: US 12,544,594 B2
(45) Date of Patent: Feb. 10, 2026

(54) DEVICES AND METHODS FOR ADAPTIVELY CONTROLLING A RADIOTHERAPY APPARATUS

(71) Applicant: Elekta, Inc., Atlanta, GA (US)

(72) Inventors: Michael McGrain Flores, Atlanta, GA (US); Igor Sinitsyn, Atlanta, GA (US); Elizabeth Jean Lansing, Atlanta, GA (US); Alain Omar Rodriguez, Atlanta, GA (US)

(73) Assignee: Elekta, Inc., Atlanta, GA (US)

( * ) Notice: Subject to any disclaimer, the term of this patent is extended or adjusted under 35 U.S.C. 154(b) by 115 days.

(21) Appl. No.: 18/475,717

(22) Filed: Sep. 27, 2023

(65) Prior Publication Data

US 2024/0108914 A1 Apr. 4, 2024

Related U.S. Application Data

(63) Continuation-in-part of application No. 17/936,225, filed on Sep. 28, 2022.

(30) Foreign Application Priority Data

Nov. 28, 2022 (NL) ...................................... 2033622

(51) Int. Cl.
*A61N 5/10* (2006.01)
(52) U.S. Cl.
CPC ......... *A61N 5/1038* (2013.01); *A61N 5/1037* (2013.01); *A61N 5/1039* (2013.01)

(58) Field of Classification Search
CPC .. A61N 5/1038; A61N 5/1037; A61N 5/1039; A61N 2005/1072; A61N 5/1045; A61N 5/1049; A61N 5/1065
See application file for complete search history.

(56) References Cited

U.S. PATENT DOCUMENTS

| | | | |
|---|---|---|---|
| 7,283,611 B1 | 10/2007 | Luan et al. | |
| 2008/0159478 A1 | 7/2008 | Keall et al. | |
| 2015/0126799 A1* | 5/2015 | Vahala | A61N 5/1037 600/1 |

(Continued)

OTHER PUBLICATIONS

"U.S. Appl. No. 17/936,225, Response filed Feb. 25, 2025 to Final Office Action mailed Dec. 4, 2024", 10 pages.

(Continued)

*Primary Examiner* — David P Porta
*Assistant Examiner* — Mamadou Faye
(74) *Attorney, Agent, or Firm* — Schwegman Lundberg & Woessner, P.A.

(57) ABSTRACT

Methods, systems and computer-readable media for controlling a radiotherapy apparatus are disclosed. A method for controlling a radiotherapy apparatus comprises obtaining a first treatment plan comprising positioning information of a beam shaping apparatus of the radiotherapy apparatus; receiving, during delivery of a radiation therapeutic beam to a target on a patient, information including a positional shift of the target; and generating a revised treatment plan based on the first treatment plan, the generating of the revised treatment plan comprising determining an updated configuration of the beam shaping apparatus from the positioning information of the first treatment plan based on the positional shift of the target.

19 Claims, 8 Drawing Sheets

(56) References Cited

U.S. PATENT DOCUMENTS

| | | |
|---|---|---|
| 2016/0213947 A1* | 7/2016 | Han .................. G06T 7/246 |
| 2017/0203126 A1 | 7/2017 | Dempsey |
| 2018/0185671 A1 | 7/2018 | Filiberti et al. |
| 2018/0369611 A1 | 12/2018 | Owens et al. |
| 2019/0381338 A1 | 12/2019 | Voronenko et al. |
| 2023/0241419 A1* | 8/2023 | Maltz .................. A61N 5/1049 |
| | | 378/19 |
| 2024/0100363 A1 | 3/2024 | Sinitsyn |
| 2024/0269484 A1* | 8/2024 | Berbeco ............... A61N 5/1037 |

OTHER PUBLICATIONS

"U.S. Appl. No. 17/936,225, Advisory Action mailed Mar. 20, 2025", 3 pages.

"U.S. Appl. No. 17/936,225, Response filed Oct. 16, 2024 to Non Final Office Action mailed Jul. 16, 2024", 11 pages.

"U.S. Appl. No. 17/936,225, Non Final Office Action mailed Apr. 23, 2025", 12 pages.

"European Application Serial No. 23200377.2, European Search Report dated Jan. 31, 2024", (Jan. 31, 2024), 8 pgs.

"U.S. Appl. No. 17/936,225, Final Office Action mailed Dec. 4, 2024", 10 pages.

"U.S. Appl. No. 17/936,225, Non Final Office Action mailed Jul. 16, 2024", 11 pages.

"European Application No. 23 200 377.2, Office Action dated Nov. 6, 2025", Nov. 6, 2025, 4 pgs.

"U.S. Appl. No. 17/936,225, Final Office Action mailed Nov. 14, 2025", 11 pgs.

* cited by examiner

DEVICES AND METHODS FOR ADAPTIVELY CONTROLLING A RADIOTHERAPY APPARATUS

CLAIM FOR PRIORITY

This application is a continuation-in-part and claims the benefit of priority of U.S. application Ser. No. 17/936,225, filed Sep. 28, 2022, and claims the benefit of priority of Netherlands Application Serial No. 2033622, filed Nov. 28, 2022; each of which is hereby incorporated by reference in its entirety.

TECHNICAL FIELD

This disclosure relates to devices and methods for adaptively controlling a radiotherapy apparatus. In particular, this disclosure relates to a computer-implemented method for controlling a radiotherapy apparatus, a computer-readable medium, a controller configured to control a radiotherapy apparatus, and a radiotherapy apparatus.

BACKGROUND

Radiotherapy can be described as the use of ionizing radiation to damage or destroy unhealthy cells in both humans and animals. The ionizing radiation may be directed to tumours on the surface of the skin or deep inside the body. Common forms of ionizing radiation include X-rays and charged particles.

A radiotherapy device typically comprises a gantry which supports a beam generation system, or other source of radiation, which is rotatable around a patient. Alternatively, static, fixed beam systems may also be used. The beam generation system is typically based on a particle accelerator such as a linear accelerator or 'linac' which comprises a radiofrequency (RF) power source, a charged particle source, and an RF cavity. Linear accelerators (especially those for medical use) accelerate charged particles such as electrons to relativistic speeds along an acceleration path through an acceleration waveguide. The acceleration waveguide comprises one or more resonant cells that surround the charged particle trajectory. The acceleration waveguide is filled with RF power from an RF power source which forms an oscillating electric field, or an electromagnetic (EM) wave, inside the cavity. Charged particles are injected from a particle source such as an electron gun into the cavity, forming a beam. As the beam traverses the oscillating EM wave, it gains energy and is thus accelerated, often up to relativistic speeds. Accelerated particles with increased effective mass deposit more energy when they collide with other matter, which is usually either biological tissue or a tungsten target, the target being used to generate X-rays. The resultant particle beam, or X-rays, may be used for imaging or treatment, so often the energy of the beam is variable.

It is important that the placement and radiation dose delivered by the beam to the patient is accurate in order to improve the effectiveness of radiotherapy treatment and to minimize damage to surrounding healthy tissue (known as organs at risk, or OARs). Prior to radiotherapy treatment, a prescribed amount of radiation to be delivered to a target region (e.g. a tumour).

Generally, a treatment plan is determined prior to a treatment session, for example using medical image(s) of a patient taken in advance of treatment. For example, a healthcare provider may use three-dimensional imaging information of patient anatomy to identify one or more target regions (e.g. tumours) as well as organs at risk near the target region(s). The treatment plan may be developed by taking into consideration clinical and dosimetric objectives and constraints, such as the minimum and maximum doses of radiation to be delivered to the tumour(s) and critical organs (e.g. organs at risk).

At the time of treatment, the patient is positioned according to the treatment plan. In some cases, a further image of the patient is taken immediately prior to treatment to detect any changes to the position and/or size of the target region that may have occurred since the treatment plan was determined. Such changes may be, for example, due to growth of a tumour, weight loss of the patient, or the like.

However, the target region may move during delivery of radiation treatment. This is especially problematic for cases where the target region is, or is near, an organ which is subject to motion. It is therefore important to ensure that an appropriate radiation dose is delivered to the target region, and an acceptably low radiation dose is delivered to the organs at risk, even when the patient moves.

Typical methods of monitoring and adapting radiotherapy treatment to patient movement involve determining that the patient has moved, pausing the radiotherapy treatment and taking a new 3D image of the patient to determine the shifted position of the target region. The patient or the couch upon which the patient are then repositioned accordingly. However, taking a new 3D image and repositioning the patient and/or the couch is time-consuming and resource-intensive, causing the treatment session to become longer and more expensive.

SUMMARY

Aspects and features of the present disclosure are described in the accompanying claims.

According to an aspect, the present disclosure provides a method for controlling a radiotherapy apparatus, the method comprising: obtaining a first treatment plan comprising positioning information of a beam shaping apparatus of the radiotherapy apparatus; receiving, during delivery of a radiation therapeutic beam to a target on a patient, information indicating a positional shift of the target; and generating a revised treatment plan based on the first treatment plan, the generating of the revised treatment plan comprising determining an updated configuration of the beam shaping apparatus from the positioning information of the first treatment plan based on the positional shift of the target.

According to a further aspect, the present disclosure provides a computer-readable medium comprising computer-executable instructions which, when executed by one or more processors of a computer device, cause the one or more processors to: obtain a first treatment plan comprising positioning information of a beam shaping apparatus of the radiotherapy apparatus; receive, during delivery of a radiation therapeutic beam to a target on a patient, information indicating a positional shift of the target; and generating a revised treatment plan based on the first treatment plan, the generating of the revised treatment plan comprising determining an updated configuration of the beam shaping apparatus from the positioning information of the first treatment plan based on the positional shift of the target.

According to a further aspect, the present disclosure provides a controller for controlling a radiotherapy apparatus, the controller configured to: obtain a first treatment plan comprising positioning information of a beam shaping apparatus of the radiotherapy apparatus; receive, during delivery of a radiation therapeutic beam to a target on a patient, information indicating a positional shift of the target; and generating a revised treatment plan based on the first treatment plan, the generating of the revised treatment plan comprising determining an updated configuration of the beam shaping apparatus from the positioning information of the first treatment plan based on the positional shift of the target.

According to a further aspect, the present disclosure provides a radiotherapy apparatus comprising a controller as disclosed in this disclosure and a beam shaping apparatus.

BRIEF DESCRIPTION OF THE DRAWINGS

Specific implementations are described below by way of example only and with reference to the accompanying drawings in which.

DETAILED DESCRIPTION

Aspects of the disclosure will be described below. In overview and without limitation, the present application relates to a radiotherapy apparatus and method therefor in which a revised treatment plan is generated when a target region of a patient shifts. The method includes obtaining a first treatment plan comprising positioning information of a multi-leaf collimator of the radiotherapy apparatus, and during delivery of a radiation therapeutic beam, receiving information indicating a positional shift of the target. A revised treatment plan is then generated based on the first treatment plan. Generating the revised treatment plan comprises determining an updated position of the MLC from the positioning information of the first treatment plan, based on the positional shift of the target. This enables radiotherapy treatment to be adaptively controlled during a treatment session, taking into account shifting of the target, whilst reducing or minimizing the need to pause or stop the treatment to re-image or re-position the patient. As such, the accuracy and efficiency of radiotherapy treatment is improved without incurring delays to the treatment session.

Figure 1:
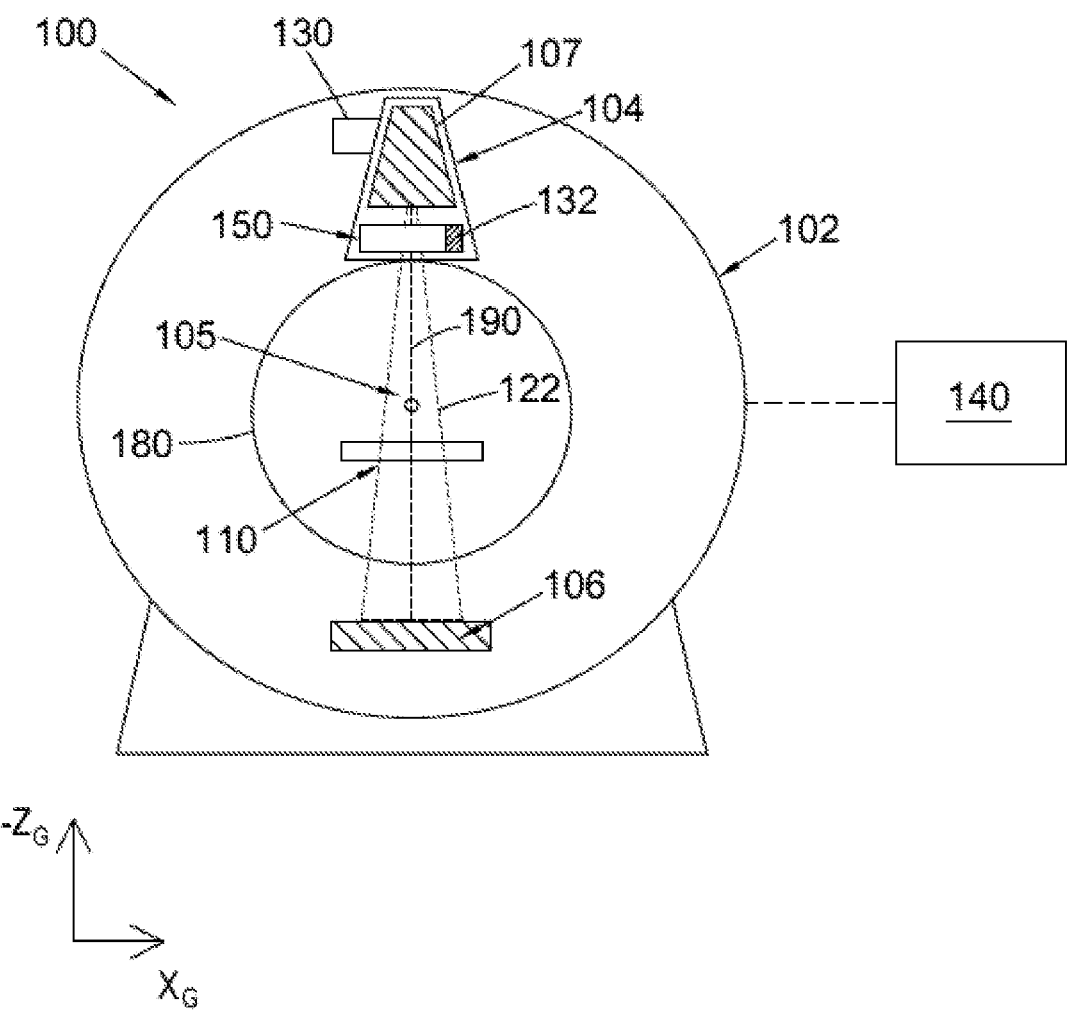
FIG. 1 shows a radiotherapy device or apparatus.

FIG. 1 depicts a radiotherapy apparatus according to the present disclosure. The Figure shows a cross-section through a radiotherapy apparatus 100 comprising a radiation head 104 and a beam receiving apparatus 106, both of which are attached to a gantry 102. The radiation head 104 includes a radiation source 107 which emits a beam of radiation 122. The radiation head 104 also includes a beam shaping apparatus 150 which controls the size and shape of the radiation field associated with the beam.

The beam receiving apparatus 106 is configured to receive radiation emitted from the radiation head 104, for the purpose of absorbing and/or measuring the beam of radiation. In the view shown in FIG. 1, the radiation head 104 and the beam receiving apparatus 106 are positioned diametrically opposed to one another.

The gantry 102 is rotatable, and supports the radiation head 104 and the beam receiving apparatus 106 such that they are rotatable around an axis of rotation 105, which may coincide with the patient longitudinal axis. As shown in FIG. 1, the gantry provides rotation of the radiation head 104 and the beam receiving apparatus 106 in a plane which is perpendicular to the patient longitudinal axis (e.g. a sagittal plane). Three gantry directions $X_G$, $Y_G$, $Z_G$ can be defined, where the $Y_G$ direction is perpendicular with gantry axis of rotation. The $Z_G$ direction extends from a point on the gantry corresponding to the radiation head, towards the axis of rotation of the gantry. Therefore, from the patient frame of reference, the $Z_G$ direction rotates around as the gantry rotates.

FIG. 1 also shows a support surface 110 on which a subject (or patient) is supported during radiotherapy treatment. The radiation head 104 is configured to rotate around the axis of rotation 105 such that the radiation head 104 directs radiation towards the subject from various angles around the subject in order to spread out the radiation dose received by healthy tissue to a larger region of healthy tissue while building up a prescribed dose of radiation at a target region.

The radiotherapy apparatus 100 is configured to deliver a radiation beam towards a radiation isocentre which is substantially located on the axis of rotation 105 at the centre of the gantry 102 regardless of the angle at which the radiation head 104 is placed.

The rotatable gantry 102 and radiation head 104 are dimensioned so as to allow a central bore 180 to exist. The central bore 180 provides opening sufficient to allow a subject to be positioned therethrough without the possibility of being incidentally contacted by the radiation head 104 or other mechanical components as the gantry rotates the radiation head 104 about the subject.

As shown in FIG. 1, the radiation head 104 emits the radiation beam 122 along a beam axis 190 (or radiation axis or beam path), where the beam axis 190 is used to define the direction in which the radiation is emitted by the radiation head. The radiation beam 122 is incident on the beam receiving apparatus 106 which can include at least one of a beam stopper and a radiation detector. The beam receiving apparatus 106 is attached to the gantry 102 on a diametrically opposite side to the radiation head 104 in order to attenuate and/or detect a beam of radiation after the beam has passed through the subject.

The radiation beam axis 190 may be defined as, for example, a centre of the radiation beam 122 or a point of maximum intensity.

The beam shaping apparatus 150 delimits the spread of the radiation beam 122. The beam shaping apparatus 150 is configured to adjust the shape and/or size of a field of radiation produced by the radiation source. The beam shaping apparatus 150 does this by defining an aperture (also referred to as a window or an opening) of variable shape to collimate the radiation beam 122 to a chosen cross-sectional shape. In this example, the beam shaping apparatus 150 may be provided by a combination of a diaphragm and a multi-leaf collimator (MLC).

The radiotherapy apparatus 100 may be configured to deliver both coplanar and non-coplanar (also referred to as tilted) modes of radiotherapy treatment. In coplanar treatment, radiation is emitted in a plane which is perpendicular to the axis of rotation of the radiation head 104. In non-coplanar treatment, radiation is emitted at an angle which is not perpendicular to the axis of rotation. In order to deliver coplanar and non-coplanar treatment, the radiation head 104 can move between at least two positions, one in which the radiation is emitted in a plane which is perpendicular to the axis of rotation (coplanar configuration) and one in which radiation is emitted in a plane which is not perpendicular to the axis of rotation (non-coplanar configuration).

In the coplanar configuration, the radiation head is positioned to rotate about a rotation axis and in a first plane. In the non-coplanar configuration, the radiation head is tilted with respect to the first plane such that a field of radiation produced by the radiation head is directed at an oblique angle relative to the first plane and the rotation axis. In the non-coplanar configuration, the radiation head is positioned to rotate in a respective second plane parallel to and displaced from the first plane. The radiation beam is emitted at an oblique angle with respect to the second plane, and therefore as the radiation head rotates the beam sweeps out a cone shape.

The beam receiving apparatus 106 remains in the same place relative to the rotatable gantry when the radiotherapy apparatus is in both the coplanar and non-coplanar modes. Therefore, the beam receiving apparatus 106 is configured to rotate about the rotation axis in the same plane in both coplanar and non-coplanar modes. This may be the same plane as the plane in which the radiation head rotates.

The beam shaping apparatus 150 is configured to reduce the spread of the field of radiation in the non-coplanar configuration in comparison to the coplanar configuration.

The radiotherapy apparatus 100 includes a controller 140 which is programmed to control the radiation source 107, beam receiving apparatus 106 and the gantry 102. Controller 140 may perform functions or operations such as treatment planning, treatment execution, image acquisition, image processing, motion tracking, motion management, and/or other tasks involved in a radiotherapy process.

Controller 140 is programmed to control features of apparatus 100 according to a radiotherapy treatment plan for irradiating a target region, also referred to as a target tissue, of a patient. The treatment plan includes information about a particular dose to be applied to a target tissue, as well as other parameters such as beam angles, dose-histogram-volume information, the number of radiation beams to be used during therapy, the dose per beam, and the like. Controller 140 is programmed to control various components of apparatus 100, such as gantry 102, radiation head 104, beam receiving apparatus 106, and support surface 110, according to the treatment plan.

Hardware components of controller 140 may include one or more computers (e.g., general purpose computers, workstations, servers, terminals, portable/mobile devices, etc.); processors (e.g., central processing units (CPUs), graphics processing units (GPUs), microprocessors, digital signal processors (DSPs), field programmable gate arrays (FPGAs), special-purpose or specially-designed processors, etc.); memory/storage devices such as a memory (e.g., read-only memories (ROMs), random access memories (RAMs), flash memories, hard drives, optical disks, solid-state drives (SSDs), etc.); input devices (e.g., keyboards, mice, touch screens, mics, buttons, knobs, trackballs, levers, handles, joysticks, etc.); output devices (e.g., displays, printers, speakers, vibration devices, etc.); circuitries; printed circuit boards (PCBs); or other suitable hardware. Software components of controller 140 may include operation device software, application software, etc.

The radiation head 104 may be connected to a head actuator 130 which is configured to actuate the radiation head 104, for example between a coplanar configuration and one or more non-coplanar configurations. This may involve translation and rotation of the radiation head 104 relative to the gantry. In some implementations, the head actuator may include a curved rail along which the radiation head 104 may be moved to adjust the position and angle of the radiation head 104. The controller 140 may control the configuration of the radiation head 104 via the head actuator 130.

The beam shaping apparatus 150 includes a shaping actuator 132. The shaping actuator is configured to control the position of one or more elements in the beam shaping apparatus 150 in order to shape the radiation beam 122. In some implementations, the beam shaping apparatus 150 includes an MLC, and the shaping actuator 132 includes means for actuating leaves of the MLC. The beam shaping apparatus 150 may further comprise a diaphragm, and the shaping actuator 132 may include means for actuating blocks of the diaphragm. The controller 140 may control the beam shaping apparatus 150 via the shaping actuator 132.

A treatment plan may comprise positioning information of beam shaping apparatus 150. The positioning information of beam shaping apparatus 150 may comprise information indicating a configuration of one or more elements of beam shaping apparatus 150, such as leaf configuration of an MLC of beam shaping apparatus 150, a configuration of a diaphragm of beam shaping apparatus 150, a configuration of an opening (e.g. window or aperture) of the MLC, and/or the like.

Figure 2:
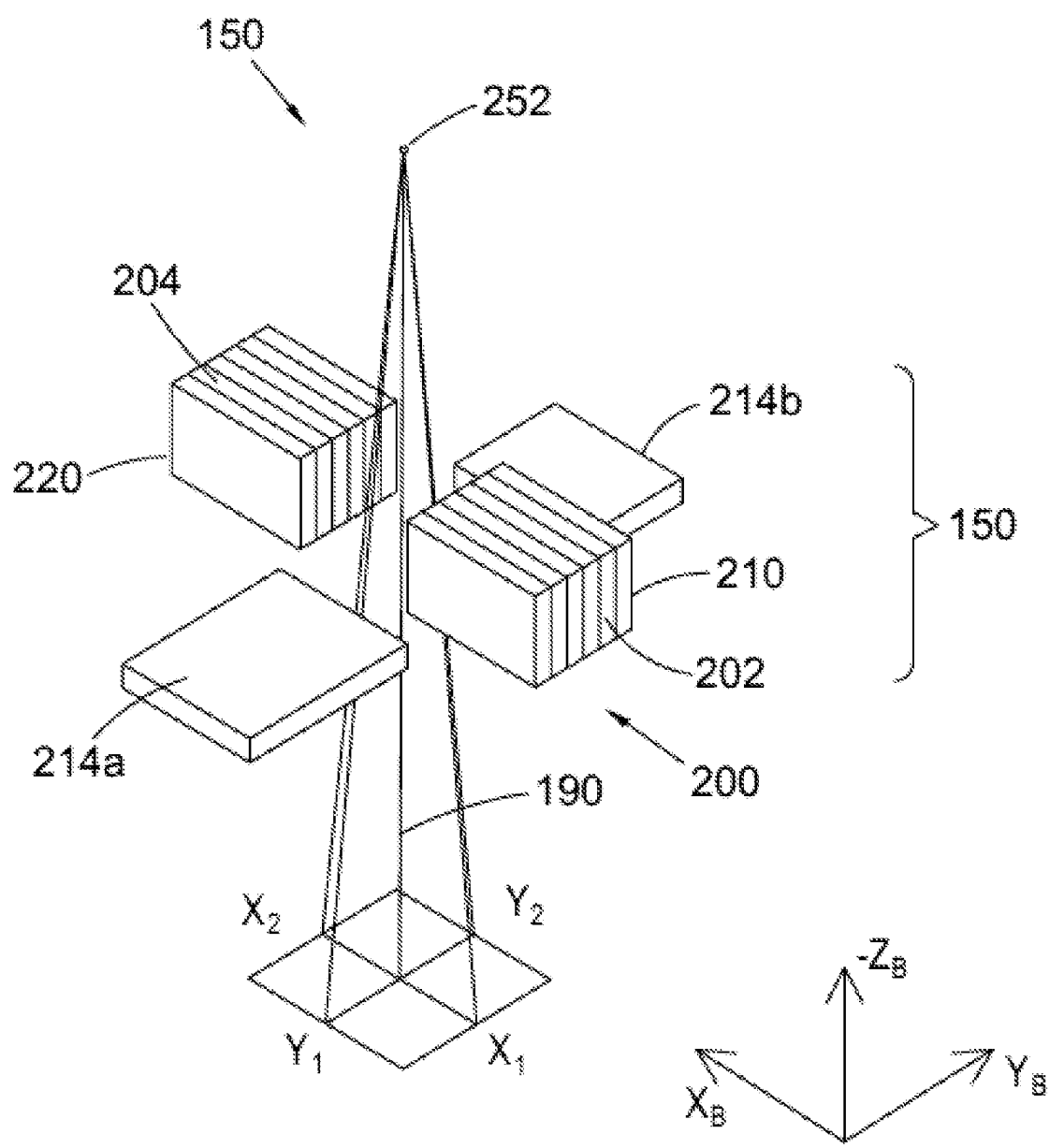
FIG. 2 depicts an example of a beam shaping apparatus.

FIG. 2 depicts an example of the beam shaping apparatus 150. FIG. 2 schematically depicts the position of a beam source 252 within the radiation source, from which radiation is produced, and schematically shows the beam passing through the beam shaping apparatus 150. The beam source 252 may be, for example, a target upon which electrons are incident to create a high-energy X-ray beam.

In the implementation depicted in FIG. 2, the beam shaping apparatus 150 includes a multi-leaf collimator, MLC, 200 and a diaphragm apparatus 214.

MLC 200 includes a plurality of elongate leaves 202, 204 oriented orthogonal to the axis of beam 122. MLC 200 may include two banks 210, 220 of leaves, forming two opposing arrays. Each leaf can be individually extended into and out of the path of radiation beam 122 in order to shape the cross-section of the beam by blocking portions thereof. The leaves are movable to provide shaping of the beam.

During radiotherapy treatment, the leaves of MLC 200 and/or the diaphragm of the beam shaping apparatus 150 (described below) are controlled to take different positions to selectively block some or all of radiation beam 122, thereby altering the shape of the beam that reaches the patient. In other words, the MLC presents an edge to the radiation beam which can be varied so as to provide a particular beam shape. That is, the MLC 200 may be used to shape, direct or modulate an intensity of the radiation beam 122. The MLC 200 may be adjusted adaptively during a treatment session. That is, the position of one or more leaves of the MLC 200 may be adjusted during the treatment session.

In some implementations, beam shaping apparatus 150 may include a bank of motors, which forms part of the shaping actuator 132, with each motor configured to move a corresponding one of the leaves. Movement of each leaf by the motors is controlled by controller 140. For example, controller 140 controls leaf movement via the motors to shape radiation beam 122 for irradiating a target tissue, such as according to a treatment plan. Controller 140 moves the leaves, including advancing and retracting the leaves, by actuation of the leaf motors.

The beam shaping apparatus 150 may also comprise a diaphragm apparatus. The diaphragm apparatus may be configured to shape the beam of radiation, in a manner similar to the MLC 200. The diaphragm apparatus may comprise one or more diaphragm blocks 214 configured to be extended into, and withdrawn from, the radiation field. In an example, the diaphragm apparatus may comprise two diaphragm blocks 214a, 214b which face each other across the radiation field.

The diaphragm blocks 214a, 214b may be configured to move in a movement axis which is generally or substantially perpendicular to the beam axis, and also generally or substantially perpendicular to the movement axis of the MLC leaves. The diaphragm blocks 214a, 214b may be made from a radiopaque material such as tungsten.

The beam shaping apparatus 150 may further comprise diaphragm actuation means (not shown) which may form part of the shaping actuator 132. In some implementations, the diaphragm actuation means includes a diaphragm motor, which is configured to effect movement of the diaphragm blocks 214a, 214b.

Three beam directions $X_B Y_B Z_B$ can be defined, where the $Z_B$ direction corresponds to the beam axis 190. The beam directions $X_B Y_B Z_B$ may be referred to as a longitudinal direction, a transverse direction and a vertical direction, respectively.

With reference to FIG. 2, it will be appreciated that actuation means of the MLC (e.g. the bank of motors) is configured to move the MLC leaves in the directions indicated as $X_1$ and $X_2$, and along a movement axis depicted in the figure as the $X_B$ direction. The diaphragm actuation means is configured to move the diaphragms in directions $Y_1$ and $Y_2$, and along a movement axis depicted in the figure as the $Y_B$ direction. While the diaphragm blocks 214a, 214b depicted in FIG. 2 are positioned 'underneath' the MLC (i.e. farther away from the beam source 252), in alternative implementations the diaphragm may be positioned 'above' the MLC (i.e. closer to the beam source 252 than the MLC).

Considering the MLC, a first array 210 may extend into the beam field in the $X_B$ direction from one side of the field, and the second array 220 may extend into the beam field in the $X_B$ direction from the opposing side of the field. The leaves can each be moved independently to define a chosen shape between the tips of the opposing leaf banks 210, 220. Each leaf may be thin in its transverse ($Y_B$) direction to provide good resolution, deep in the $Z_B$ direction to provide adequate absorption, and long in its longitudinal $X_B$ direction to allow it to extend across the field to a desired position.

Movable blocks 214a and 214b of the diaphragm may be used to adjust the width of the aperture. Specifically, the diaphragm blocks may define the aperture in the $Y_B$ direction. The leaves of the MLC can be fully extended such that directly opposing leaves meet. The diaphragm blocks 214a, 214b can be moved in the $Y_B$-direction as desired.

Figure 3:
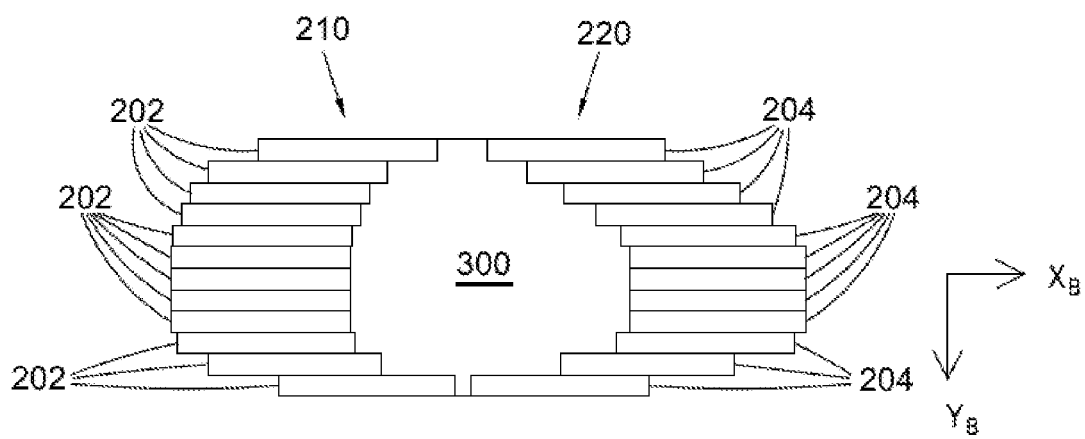
FIG. 3 shows a multi-leaf collimator configuration according to embodiments.

FIG. 3 shows a multi-leaf collimator configuration. The MLC 200 has a first orientation with respect to the patient longitudinal axis. In particular, FIG. 3 illustrates an arrangement of the leaves of the MLC 200.

MLC 200 may include two banks 210, 220 of leaves, each leaf of which can be individually extended into and out from the path of the radiation beam 122 so that their respective tips shape the cross-section of the beam by blocking portions thereof. The controller 140 controls placement of the leaf tips 206 to shape the radiation beam 122, defining an aperture 300 through which the radiation beam 122 can pass, thereby shaping the beam for irradiating a target tissue according to a treatment plan.

The plurality of leaves 202, 204 are oriented orthogonal to the axis of the beam 122, which in the view of FIG. 3 is travelling in a direction into the page. In this implementation, the MLC is oriented such that the leaves move back and forth in the x direction.

The controller 140 may be configured to control the beam shaping apparatus to reduce the spread of radiation, and to target the beam 122 to a position and shape of a target region.

Figure 4:
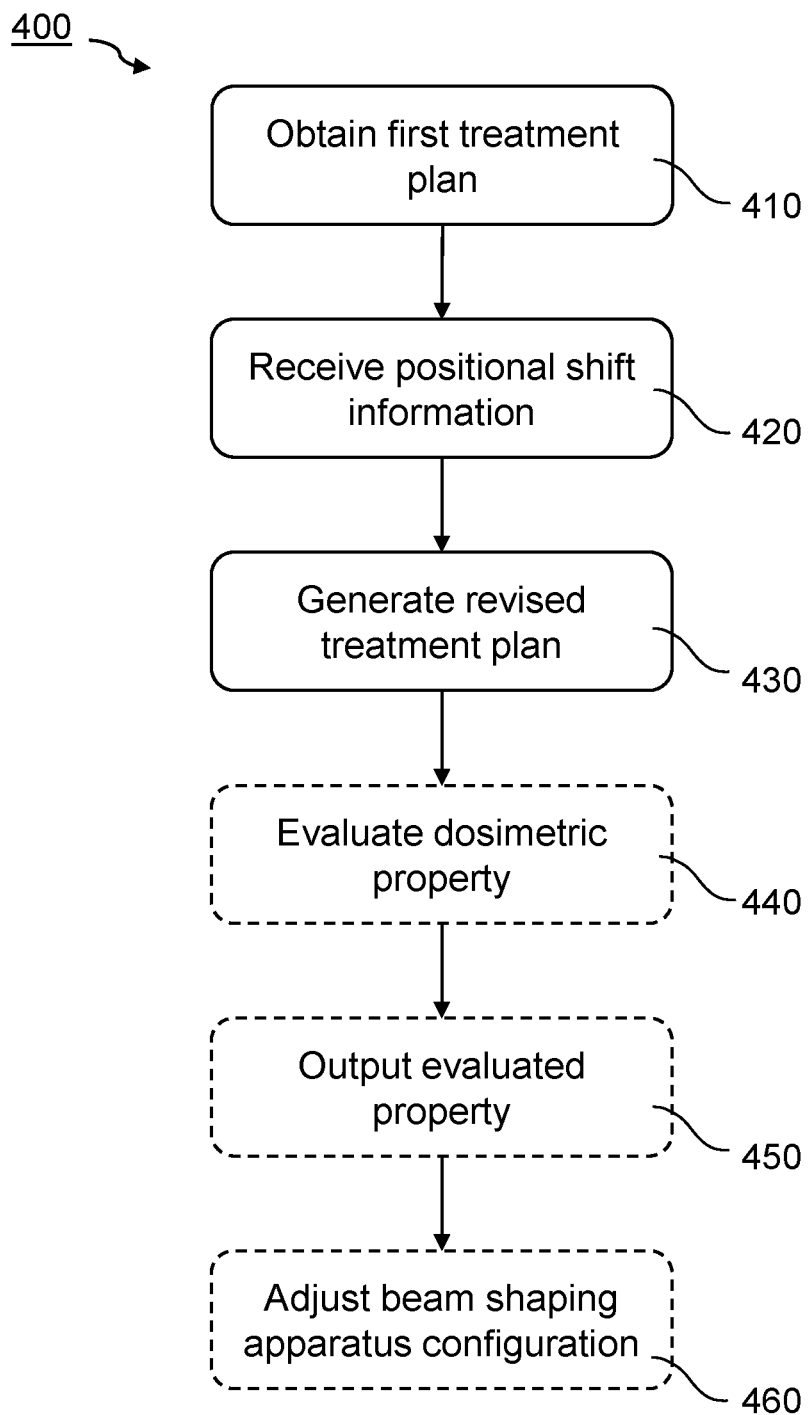
FIG. 4 shows a flowchart of a method for controlling a radiotherapy apparatus according to embodiments.

FIG. 4 shows a flowchart of a method 400 for controlling a radiotherapy apparatus according to embodiments. The method 400 may be performed by a controller configured to control a radiotherapy apparatus. That is, the method may be a computer-implemented method.

In method 400, a first treatment plan is obtained in operation 410. The first treatment plan comprises positioning information of a beam shaping apparatus of the radiotherapy apparatus. The beam shaping apparatus may comprise a multi-leaf collimator (MLC) and/or a diaphragm, for example. The positioning information of the beam shaping apparatus may comprise, for example, a shape of the MLC opening(s), e.g. a configuration of leaves of the MLC and/or a configuration of a diaphragm of the to define an aperture corresponding to a shape of a target region cross-section or projection. The first treatment plan may be based on a reference treatment plan taken in advance of the treatment session. For example, the first treatment plan may be an adapted treatment plan, which may be obtained by, e.g., adjusting the reference treatment plan based on updated imaging information acquired shortly or immediately before delivery of the beam. That is, the first treatment plan may be comprise adjustments to the reference treatment plan based on more recent positional information of the patient and/or the target region. The first treatment plan may be based on a three-dimensional image, such as a 3D magnetic resonance (MR) image, obtained prior to the treatment session, as well as any necessary adjustments thereto. The first treatment plan may comprise parameters, such as gantry angle, beam parameters and/or configuration (e.g. position) information of the beam shaping apparatus. One of more of the parameters provided in the first treatment plan may be optimized.

A reference treatment plan may comprise a 2D template imaging slice for each orientation. The 2D image slices may depict a target region, or portion thereof. The first treatment plan may comprise a 3D volumetric image taken while the patient is on the couch, to which the 2D template imaging slices are registered.

During delivery of a radiation therapeutic beam to the target region (also referred to as the target), the method 400 further comprises, in operation 420, receiving information indicating a positional shift of the target. The positional shift of the target may, for example, be representative of a systematic shift. The information indicating the positional shift of the target may comprise a longitudinal displacement, a vertical displacement and a transverse displacement of the target. The longitudinal displacement, vertical displacement and transverse displacement may be relative to a position of the target defined in the first treatment plan. The longitudinal displacement, vertical displacement and transverse displacement may be expressed in the form of a vector. In some embodiments, the information indicating the positional shift of the target may be based on, and/or may comprise, a 2-dimensional slice image. The 2-dimensional slice image may be obtained during the treatment session.

The information indicating the positional shift of the target may be obtained using anatomic position monitoring (APM), for example as described in US 2021/0046329 Al, the entirety of which is incorporated herein by reference.

In some embodiments, the information indicating the positional shift of the target may comprise a 2D image slice for each orientation obtained during treatment. The 2D image slices may depict a target region, or portion thereof. For each orientation, the 2D template imaging slice (e.g. comprised in the first treatment plan) may be registered against the 2D image slice corresponding to the same plane as the 2D template imaging slice. Additionally or alternatively, the information indicating the positional shift of the target may comprise a result of registering the 2D template imaging slices against the 2D image slices. That is, in some embodiments, the information indicating the positional shift of the target may be textual or numeric. For example, in some embodiments, the information indicating the positional shift of the target may contain three numerical values indicating the displacement of the target in each of three dimensions, for example using a Cartesian coordinate system.

Once the positional shift information is received, the method 400 further comprises, in operation 430, generating a revised treatment plan. Generating the revised treatment plan comprises determining an updated configuration of the beam shaping apparatus from the positioning information of the first treatment plan, based on the positional shift of the target. The updated configuration of the beam shaping apparatus may comprise an updated position (e.g. configuration) of an MLC of the beam shaping apparatus. The updated configuration of the beam shaping apparatus may comprise updated MLC opening(s) determined based on the positional shift of the target. That is, every MLC opening projection closely follows a projection of a target structure in a plane perpendicular to a corresponding beam axis. In some examples, the aperture (i.e. opening) defined by the beam shaping apparatus 150 is shifted by an amount proportional to the received positional shift. If, for example, a projection of the target structure moves by a displacement dx (e.g. 2 cm) in a first direction (e.g. to the right), the configuration of the beam shaping apparatus is adjusted to compensate accordingly. For example, each MLC opening projection is moved by a corresponding amount (e.g. 2 cm to the right). In this example, when a displacement dx of the target is moved by 2 cm, the projection of the MLC opening would move by 2 cm, but the opening at the beam shaping apparatus 150 (e.g. at 202, 204, 214a and 214b) would move by a smaller amount because it is closer to the source. The precision of the MLC openings is determined by the MLC leaf size. In another example, if the information indicating a positional shift of the target indicates that the target has moved by some displacement (e.g. the displacement of the target having a vertical component, dz) toward the source, the projection of the structure becomes larger. The projection of MLC openings may then be increased in size accordingly with the same scaling coefficient. Again, the precision of the MLC openings is based on MLC leaf size.

Figure 6:
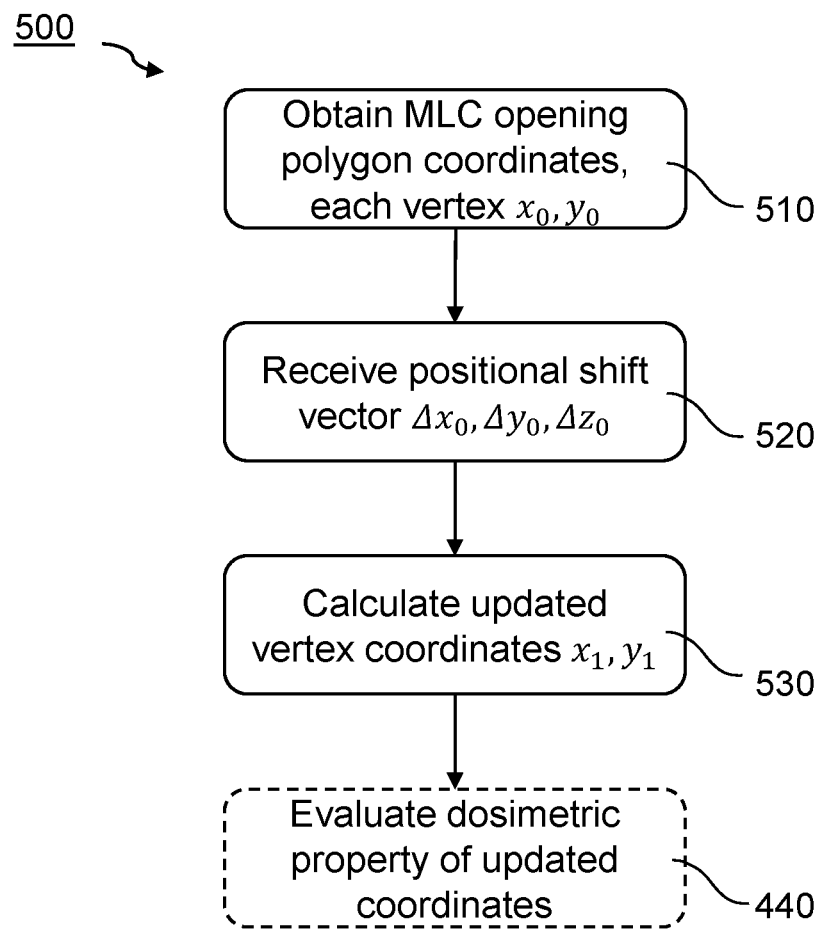
FIG. 6 shows a flowchart of a method for determining an updated treatment plan according to embodiments.

An example of determining an updated configuration of the beam shaping apparatus from the positioning information of the first treatment plan based on the positional shift of the target, is shown in FIG. 6.

In some embodiments, the revised treatment plan comprises the updated configuration of the beam shaping apparatus (for example, an updated position of the MLC (e.g. an updated opening of the MLC) and/or an updated configuration of a diaphragm of the beam shaping apparatus), but other parameters from the first treatment plan may be unchanged. For example, the revised treatment plan may be identical, or substantially identical, to the first treatment plan for most or all other parameters specified therein, other than the beam shaping configuration. That is, the gantry angle and/or the position of the couch upon which the patient is positioned may remain unchanged.

Optionally, operation 430 comprises maintaining one or more of an optimized gantry angle, an optimized gantry position and optimized beam parameters from the first treatment plan, and updates a configuration of the beam shaping apparatus. Updating a configuration of the beam shaping apparatus does not require optimization.

In some embodiments, method 400 may optionally comprise, in operation 440, evaluating a dosimetric property. The dosimetric property may be, for example, a radiation dose delivered to the target region and/or a radiation dose delivered to an organ at risk. The dosimetric property may be evaluated based at least in part on the updated configuration of the beam shaping apparatus (e.g. an updated position of the MLC, e.g. an updated MLC opening shape) determined in operation 430 and the positional shift of the target (e.g. the shifted position of the target). In some embodiments, the dosimetric property may additionally be based on one or more predefined anatomies.

In some embodiments, method 400 may optionally comprise outputting the evaluated dosimetric property to a user, for example visually (e.g. on a display) and/or audibly (e.g. through a speaker). The user may be prompted to confirm whether or not to proceed with adjusting the beam shaping apparatus in accordance with the revised treatment plan based on the output evaluated dosimetric property. Once the user has input a confirmation to proceed (e.g. by clicking a button on a display, entering a user input indicating confirmation into the controller, e.g. via an input device, speaking into a microphone to indicate confirmation or the like), the beam shaping apparatus may be adjusted as will be described with reference to operation 460 below.

In some embodiments, operation 450 may be omitted, and the controller may instead determine whether or not to proceed. For example, if the evaluated dosimetric property is within an acceptable range or margin, the controller may proceed to operation 460 to adjust the beam shaping apparatus (e.g. the MLC position) according to the revised treatment plan, that is, according to the updated configuration of the beam shaping apparatus.

Either after operations 430, 440 and/or 450, method 400 may proceed to adjusting the beam shaping apparatus (e.g. an MLC of the beam shaping apparatus) in accordance with the updated configuration of the beam shaping apparatus (e.g. an updated position (e.g. opening) of the MLC) in the revised treatment plan. Adjusting the beam shaping apparatus may comprise, for example, adjusting an opening, e.g. a position of the MLC (e.g. by adjusting one or more leaves of the MLC) such that the leaves of the MLC define an aperture corresponding to the shifted position of the target, and/or adjusting a diaphragm of the beam shaping apparatus.

Figure 5:
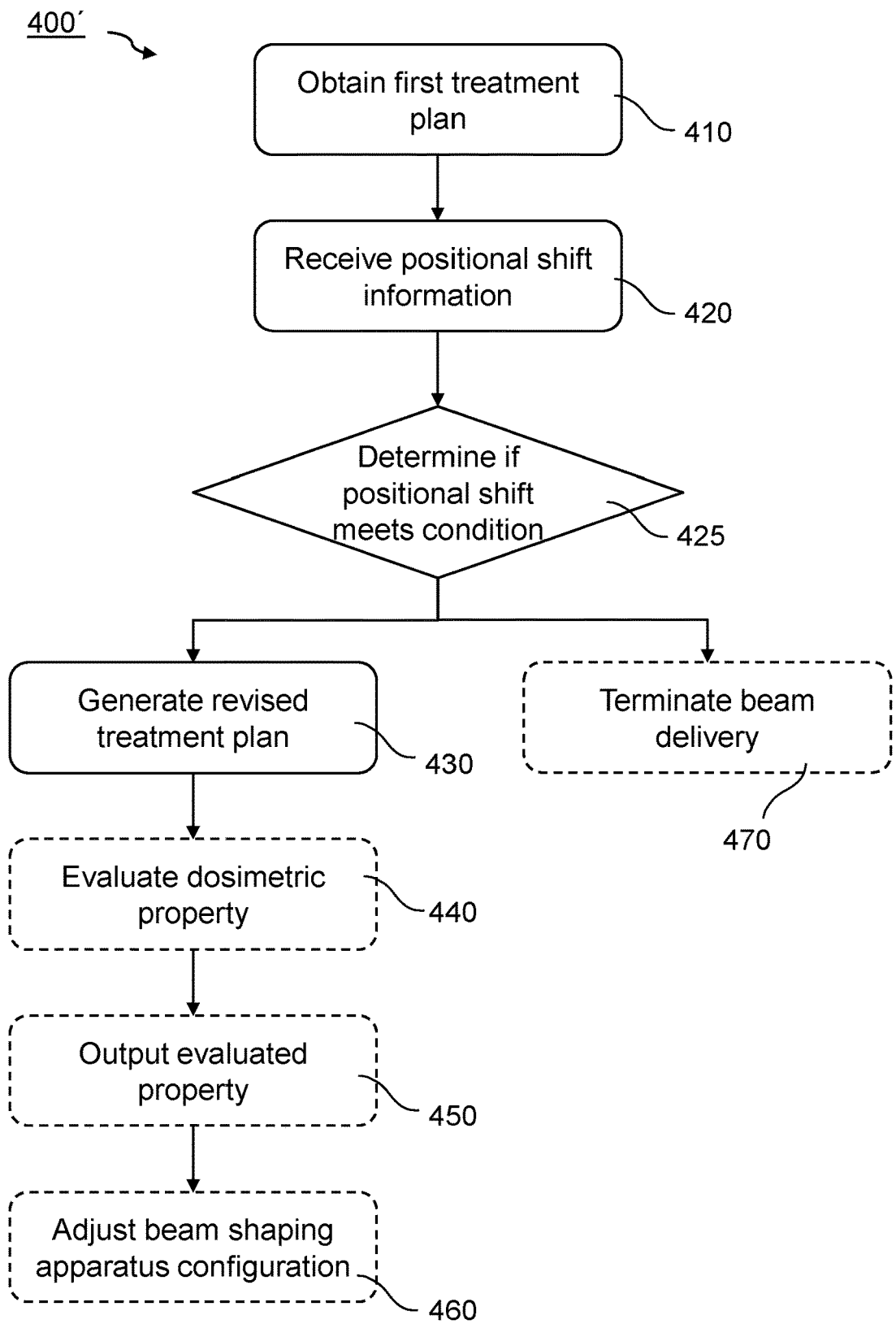
FIG. 5 shows a flowchart of a method for controlling a radiotherapy apparatus according to embodiments.

FIG. 5 shows a flowchart of a variation of method 400 (labelled method 400') for controlling a radiotherapy apparatus according to embodiments. The method 400' may be performed by a controller configured to control a radiotherapy apparatus. The method 400' may be a computer-implemented method. The method illustrated in FIG. 5 is similar to that of FIG. 4. For the sake of conciseness, operations with reference numerals identical to those in FIG.

4 are the same as those described with reference to FIG. 4 and will not be described again in full.

According to method 400', after receiving the positional shift information in operation 420, the method 400' may proceed to determining if the positional shift meets a predefined condition in operation 425. The predefined condition may be, for example, a threshold shift amplitude. That is, the predefined condition may be met if the positional shift of the target is less than or equal to a threshold shift amplitude. The threshold shift amplitude may, in some examples, relate to a maximum positional shift that can be compensated for by adjusting the beam shaping apparatus (e.g. the MLC opening, e.g. MLC position). In other examples, the threshold shift amplitude may correspond to a threshold of motion which has been predefined, e.g. by a user. The threshold shift amplitude may be dependent on the region of the patient being treated.

If it is determined, in operation 425, that the positional shift of the target meets the predetermined condition, the method 400' may proceed to operation 430, and subsequently optionally to one or more of operations 440, 450 and 460 as described with reference to FIG. 4.

If it is determined, in operation 425, that the positional shift of the target does not meet the predetermined condition, e.g. if the positional shift of the target exceeds a threshold shift amplitude, the method 400' may optionally proceed to terminate the beam delivery in operation 470.

FIG. 6 illustrates a method 500 of generating a revised treatment plan. The revised treatment plan is generated by determining an updated configuration of the beam shaping apparatus from the positioning information of the first treatment plan, based on the positional shift of the target. This corresponds to step 430 in FIGS. 4 and 5.

The updated configuration of the beam shaping apparatus may comprise an updated position (e.g. configuration) of an MLC of the beam shaping apparatus. The updated configuration of the beam shaping apparatus may comprise updated MLC opening(s) determined based on the positional shift of the target.

The 510 in FIG. 6 shows that the first treatment plan obtained in step 410 comprises a set of control points (segments). Each control point or segment includes information on the dose, the gantry rotation angle and the beam shape as defined by the beam shaping apparatus. The beam shape is defined by the MLC opening, which is created by the position of the leaves of the MLC. The MLC opening is defined in the plane of the isocentre (the isocentre plane). It is standard (DICOM standard) for coordinates of the MLC leaves to be exported and defined in the isocentre plane.

The MLC opening at each control point is approximated by polygon. The polygon is defined by a number of vertices. Each vertex has an x, y coordinate in the isocentre plane. In the first treatment plan each vertex is described by a coordinate $(x_0, y_0)$.

The shift of the target is received in step 520. Movement, or shift of the target from an original position to an updated position, is detected or measured as described above. Shift of the target can be defined by a vector $(\Delta x_0, \Delta y_0, \Delta z_0)$. This is in the patient coordinate system.

When the target moves, a revised treatment plan with an updated configuration of the beam shaping apparatus is calculated to ensure the target remains in the beam path (or, more precisely, to ensure that the beam path remains directed on the target). Updating the configuration of the beam shaping apparatus comprises updating the shape of the MLC opening. The MLC opening in the isocentre plane represents the delimitation of the beam and therefore defines the location of the beam on the isocentre plane. The MLC opening is updated when the target shifts to ensure the target remains in the beam path, and to reduce the amount of radiation delivered to healthy tissue. Therefore the MLC opening in the isocentre plane is updated based on the positional shift of the target.

An updated configuration of the MLC opening is determined based on the positional of the target by calculating an updated polygon which defines the MLC opening. The original polygon with vertices denoted as $(x_0, y_0)$ is updated. For each vertex of the polygon which defines the MLC opening, new updated coordinates are calculated, $(x_1, y_1)$.

Based on the detected shift, the new coordinates of each vertex of the MLC polygon are recalculated to new position $(x_1, y_1)$ in step 530 according to the following formulas:

$$x_1 = \frac{x_0 \cdot h + \Delta x \cdot H}{h - \Delta z}$$
$$y_1 = \frac{y_0 \cdot h + \Delta y \cdot H}{h - \Delta z}$$

$x_0$—original vertex x coordinate (in isocenter plane),
$y_0$—original vertex y coordinate (in isocenter plane),
$x_1$—new x coordinate,
$y_1$—new y cordinate,
h—distance from source to center of the target structure,
H—distance from source to isocenter plane.
$\Delta x$, $\Delta y$ and $\Delta z$ are calculated from original $\Delta x_0$, $\Delta y_0$, $\Delta z_0$ using linear transformation:

$$\begin{bmatrix} \Delta x \\ \Delta z \\ \Delta y \end{bmatrix} = \begin{bmatrix} \cos\theta & \sin\theta & 0 \\ \sin\theta & -\cos\theta & 0 \\ 0 & 0 & 1 \end{bmatrix} \begin{bmatrix} \Delta x_0 \\ \Delta y_0 \\ \Delta z_0 \end{bmatrix}$$

θ—gantry angle.

The distance between the source and the isocentre plane is denoted as H. The target does not necessarily lie in the isocentre plane, and the distance between the source and the centre of the target structure is denoted as h.

The radiation head, including the source and the beam shaping apparatus, rotates around the patient on the gantry. The shift of the target is measured in the patient coordinate system (i.e. DICOM patient system). The isocentre plane in which the opening is defined is in a different plane to the patient plane in which the positional shift is measured. Therefore $\Delta x$, $\Delta y$ and $\Delta z$ are calculated using a linear translation of the target shift based on the gantry angle θ relative to the patient coordinate system.

New coordinates are calculated for each vertex to define an updated polygon of the MLC opening in the updated treatment plan. The updated treatment plan with the updated MLC opening is then outputted for the remaining steps of the method 400 or 400'. For example, the updated treatment plan is outputted for the step 440, where the dosimetric properties of the updated treatment plan (including the updated MLC opening polygon) are evaluated.

Figure 7:
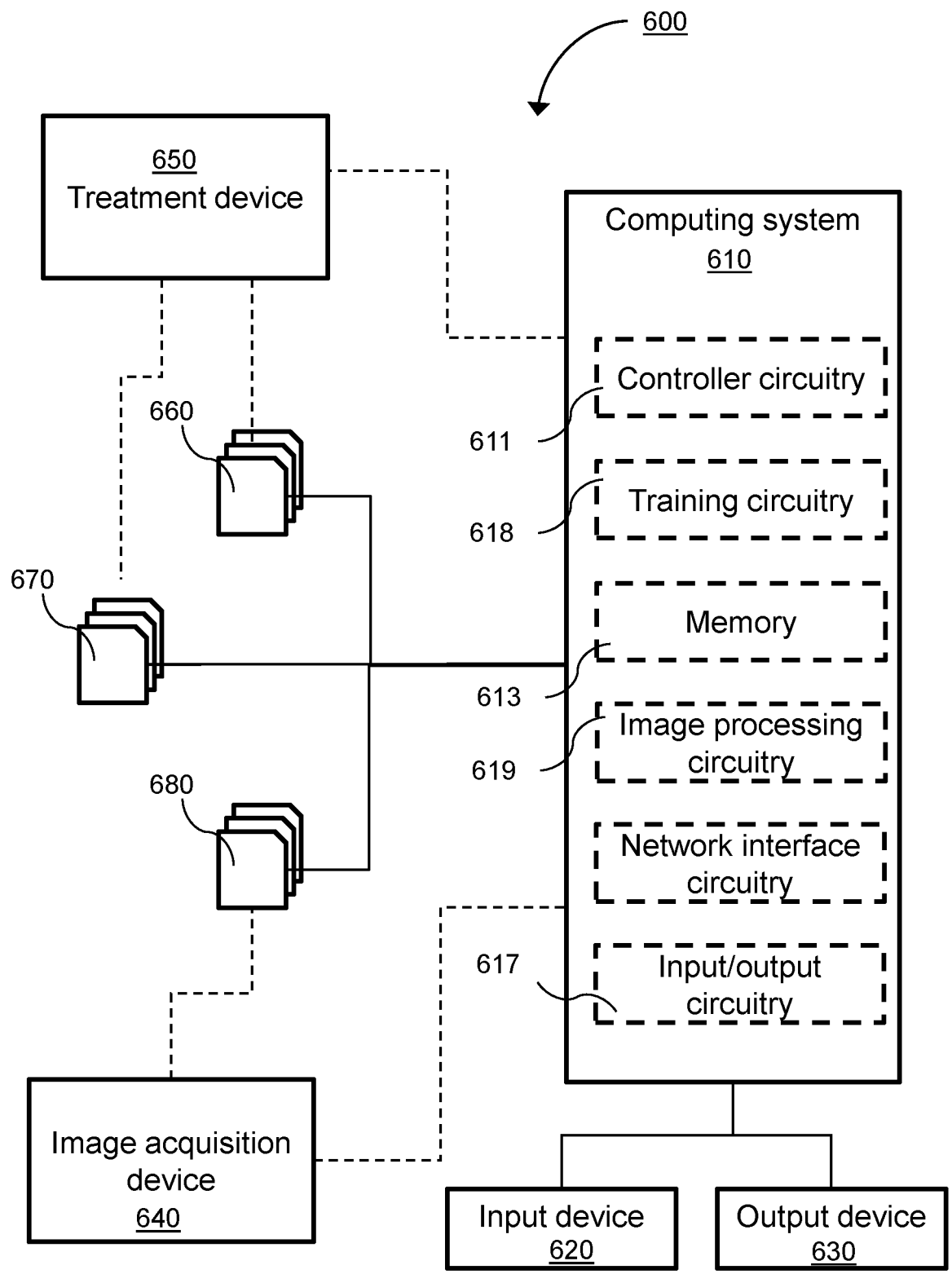
FIG. 7 depicts a block diagram of one implementation of a computing device according to embodiments.

FIG. 7 illustrates a block diagram of one implementation of a radiotherapy system 600. The radiotherapy system 600 comprises a computing system 610 within which a set of instructions, for causing the computing system 610 to perform any one or more of the methods discussed herein, may be executed.

The computing system 610 shall be taken to include any number or collection of machines, e.g. computing device(s), that individually or jointly execute a set (or multiple sets) of instructions to perform any one or more of the methods discussed herein. That is, hardware and/or software may be provided in a single computing device, or distributed across a plurality of computing devices in the computing system. In some implementations, one or more elements of the computing system may be connected (e.g., networked) to other machines, for example in a Local Area Network (LAN), an intranet, an extranet, or the Internet. One or more elements of the computing system may operate in the capacity of a server or a client machine in a client-server network environment, or as a peer machine in a peer-to-peer (or distributed) network environment. One or more elements of the computing system may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

The computing system 610 includes controller circuitry 611 and a memory 613 (e.g., read-only memory (ROM), flash memory, dynamic random access memory (DRAM) such as synchronous DRAM (SDRAM) or Rambus DRAM (RDRAM), etc.). The memory 613 may comprise a static memory (e.g., flash memory, static random access memory (SRAM), etc.), and/or a secondary memory (e.g., a data storage device), which communicate with each other via a bus (not shown).

Controller circuitry 611 represents one or more general-purpose processors such as a microprocessor, central processing unit, accelerated processing units, or the like. More particularly, the controller circuitry 611 may comprise a complex instruction set computing (CISC) microprocessor, reduced instruction set computing (RISC) microprocessor, very long instruction word (VLIW) microprocessor, processor implementing other instruction sets, or processors implementing a combination of instruction sets. Controller circuitry 611 may also include one or more special-purpose processing devices such as an application specific integrated circuit (ASIC), a field programmable gate array (FPGA), a digital signal processor (DSP), network processor, or the like. One or more processors of the controller circuitry may have a multicore design. Controller circuitry 611 is configured to execute the processing logic for performing the operations and steps discussed herein.

The computing system 610 may further include a network interface circuitry 618. The computing system 610 may be communicatively coupled to an input device 620 and/or an output device 630, via input/output circuitry 617. In some implementations, the input device 620 and/or the output device 630 may be elements of the computing system 610. The input device 620 may include an alphanumeric input device (e.g., a keyboard or touchscreen), a cursor control device (e.g., a mouse or touchscreen), an audio device such as a microphone, and/or a haptic input device. The output device 630 may include an audio device such as a speaker, a video display unit (e.g., a liquid crystal display (LCD) or a cathode ray tube (CRT)), and/or a haptic output device. In some implementations, the input device 620 and the output device 630 may be provided as a single device, or as separate devices.

In some implementations, the computing system 610 may comprise image processing circuitry 619. Image processing circuitry 619 may be configured to process image data 680 (e.g. images, or imaging data), such as medical images obtained from one or more imaging data sources, a treatment device 650 and/or an image acquisition device 640. Image processing circuitry 619 may be configured to process, or pre-process, image data. For example, image processing circuitry 619 may convert received image data into a particular format, size, resolution or the like. In some implementations, image processing circuitry 619 may be combined with controller circuitry 611.

In some implementations, the radiotherapy system 600 may further comprise an image acquisition device 640 and/or a treatment device 650, such as those disclosed herein in the examples of FIG. 1. The image acquisition device 640 and the treatment device 650 may be provided as a single device. In some implementations, treatment device 650 is configured to perform imaging, for example in addition to providing treatment and/or during treatment. The treatment device 650 comprises the main radiation delivery components of the radiotherapy system, such as beam shaping apparatus 150, e.g. MLC 200.

Image acquisition device 640 may be configured to perform positron emission tomography (PET), computed tomography (CT), magnetic resonance imaging (MRI), single positron emission computed tomography (SPECT), x-ray, and the like.

Image acquisition device 640 may be configured to output image data 680, which may be accessed by computing system 610. Treatment device 650 may be configured to output treatment data 660, which may be accessed by computing system 610.

Computing system 610 may be configured to access or obtain treatment data 660, planning data 670 and/or image data 680. Treatment data 660 may be obtained from an internal data source (e.g. from memory 613) or from an external data source, such as treatment device 650 or an external database. Planning data 670 may be obtained from memory 613 and/or from an external source, such as a planning database. Planning data 670 may comprise information obtained from one or more of the image acquisition device 640 and the treatment device 650.

Figure 8:
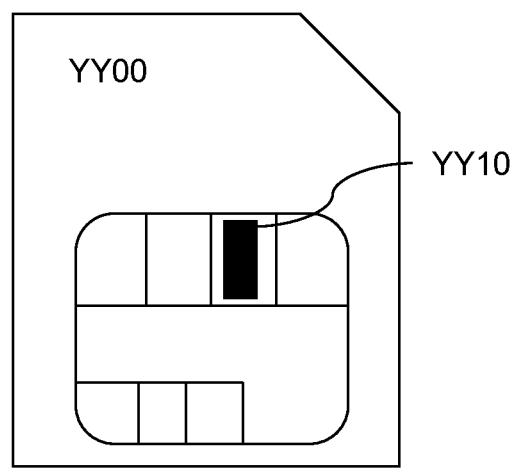
FIG. 8 depicts a diagram of a computer-readable medium according to embodiments.

The various methods described above may be implemented by a computer program. The computer program may include computer code (e.g. instructions) 710 arranged to instruct a computer to perform the functions of one or more of the various methods described above. The steps of the methods described above may be performed in any suitable order. For example, operation 430 of method 400 (or 400') may be performed after, simultaneously or substantially simultaneously with operation 440. The computer program and/or the code 710 for performing such methods may be provided to an apparatus, such as a computer, on one or more computer readable media or, more generally, a computer program product 700)), depicted in FIG. 8. The computer readable media may be transitory or non-transitory. The one or more computer readable media 700 could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD. The instructions YY10 may also reside, completely or at least partially, within the memory 613 and/or within the controller circuitry 611 during execution thereof by the computing system 610, the memory 613 and the controller circuitry 611 also constituting computer-readable storage media.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may comprise a special-purpose processor, such as an FPGA or an ASIC. A hardware component may also include programmable logic or circuitry that is temporarily configured by software to perform certain operations.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying,", "obtaining", "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

Aspects and features of the present disclosure are set forth in the following numbered clauses.

Clause 1. A computer-implemented method for controlling a radiotherapy apparatus, the method comprising:
  obtaining a first treatment plan comprising positioning information of a beam shaping apparatus of the radiotherapy apparatus;
  receiving, during delivery of a radiation therapeutic beam to a target on a patient, information indicating a positional shift of the target; and
  generating a revised treatment plan based on the first treatment plan, the generating of the revised treatment plan comprising determining an updated configuration of the beam shaping apparatus from the positioning information of the first treatment plan based on the positional shift of the target.

Clause 2. The method of clause 1, wherein the beam shaping apparatus comprises a multi-leaf collimator (MLC), and wherein the updated configuration of the beam shaping apparatus comprises an updated position of the MLC.

Clause 3. The method of clause 1 or clause 2, further comprising:
  determining if the positional shift meets a predetermined condition; and wherein generating the revised treatment plan is performed if the positional shift meets the predetermined condition.

Clause 4. The method of clause 3, wherein if the positional shift does not meet the predetermined condition, the method comprises terminating the delivery of the radiation therapeutic beam.

Clause 5. The method of clause 3 or clause 4, wherein the predetermined condition comprises the positional shift being less than or equal to a threshold shift amplitude.

Clause 6. The method of any preceding clause, further comprising adjusting the beam shaping apparatus according to the determined updated configuration of the beam shaping apparatus.

Clause 7. The method of any preceding clause, further comprising evaluating a dosimetric property based at least in part on the updated configuration of the beam shaping apparatus and the positional shift of the target.

Clause 8. The method of clause 7, wherein the dosimetric property comprises a radiation dose.

Clause 9. The method of clause 7 or clause 8, further comprising, if the evaluated dosimetric property meets a predetermined dosimetric criterion, adjusting the beam shaping apparatus in accordance with the updated configuration of the beam shaping apparatus.

Clause 10. The method of any one of clause 7 to clause 9, further comprising outputting a result of the evaluation of the dosimetric property to a user, and prompting the user to confirm whether to proceed with adjusting the beam shaping apparatus in accordance with the updated configuration of the beam shaping apparatus.

Clause 11. The method of any preceding clause, wherein the first treatment plan is generated before delivery of the radiation therapeutic beam based on a reference plan.

Clause 12. The method of any preceding clause, wherein the information indicating the positional shift of the target comprises a longitudinal displacement, a vertical displacement and a transverse displacement of the target.

Clause 13. The method of any preceding clause, wherein the information indicating the positional shift of the target is based on one or more 2-dimensional slice images.

Clause 14. The method of any preceding clause, wherein determining the updated configuration of the beam shaping apparatus comprises determining an updated configuration of leaves of a multi-leaf collimator of the beam shaping apparatus and/or an updated configuration of a diaphragm of the beam shaping apparatus.

Clause 15. The method of clause 14, wherein the positioning information of the beam shaping apparatus in the first treatment plan comprises an opening of the multi-leaf collimator defined by a polygon, and wherein determining an updated configuration of the beam shaping apparatus comprises determining an updated polygon for the opening of the multi-leaf collimator.

Clause 16. The method of clause 15, wherein the multi-leaf collimator opening in the first treatment plan is defined by a polygon having a plurality of vertices, and wherein determining an updated polygon comprises determining updated vertices based on the positional shift of the target.

Clause 17. The method of clause 16, wherein information indicating a positional shift of the target comprises a three-dimensional vector which is used to determine updated vertices.

Clause 18. The method of clause 17, wherein the updated vertices are determined according to the following formula:

$$x_1 = \frac{x_0 \cdot h + \Delta x \cdot H}{h - \Delta z}$$

$$y_1 = \frac{y_0 \cdot h + \Delta y \cdot H}{h - \Delta z}$$

$x_0$—original vertex x coordinate (in isocenter plane),
$y_0$—original vertex y coordinate (in isocenter plane),
$x_1$—new x coordinate,
$y_1$—new y cordinate,
h—distance from source to center of the target structure,
H—distance from source to isocenter plane.

$\Delta x$, $\Delta y$ and $\Delta z$ are calculated from original $\Delta x_0$, $\Delta y_0$, $\Delta z$ using linear transformation:

$$\begin{bmatrix} \Delta x \\ \Delta z \\ \Delta y \end{bmatrix} = \begin{bmatrix} \cos\theta & \sin\theta & 0 \\ \sin\theta & -\cos\theta & 0 \\ 0 & 0 & 1 \end{bmatrix} \begin{bmatrix} \Delta x_0 \\ \Delta y_0 \\ \Delta z_0 \end{bmatrix}$$

$\theta$—gantry angle relative to the patient coordinate system,
($\Delta x_0$, $\Delta y_0$, $\Delta z_0$) is the positional shift of the target in the patient coordinate system.

Clause 19. A computer-readable medium comprising computer-executable instructions which, when executed by one or more processors of a computer device, cause the one or more processors to:
  obtain a first treatment plan comprising positioning information of a beam shaping apparatus of the radiotherapy apparatus;
  receive, during delivery of a radiation therapeutic beam to a target on a patient, information indicating a positional shift of the target; and
  generating a revised treatment plan based on the first treatment plan, the generating of the revised treatment plan comprising determining an updated configuration of the beam shaping apparatus from the positioning information of the first treatment plan based on the positional shift of the target.

Clause 20. The computer-readable medium of clause 19, wherein the beam shaping apparatus comprises a multi-leaf collimator (MLC), and wherein the updated configuration of the beam shaping apparatus comprises an updated position of the MLC.

Clause 21. The computer-readable medium of clause 19 or clause 20, wherein the instructions, when executed by the one or more processors, further cause the one or more processors to:
  determine if the positional shift meets a predetermined condition, wherein generating the revised treatment plan is performed if the positional shift meets the predetermined condition.

Clause 22. The computer-readable medium of clause 21, wherein the instructions, when executed by the one or more processors, further cause the one or more processors to, if the positional shift does not meet the predetermined condition, terminate the delivery of the radiation therapeutic beam.

Clause 23. The computer-readable medium of clause 21 or clause 22, wherein the predetermined condition comprises the positional shift being less than or equal to a threshold shift amplitude.

Clause 24. The computer-readable medium of any one of clause 19 to clause 23, wherein the instructions, when executed by the one or more processors, further cause the one or more processors to adjust the beam shaping apparatus according to the determined updated configuration of the beam shaping apparatus Clause 25. The computer-readable medium of any one of clause 19 to clause 23, wherein the instructions, when executed by the one or more processors, further cause the one or more processors to evaluate a dosimetric property based at least in part on the updated configuration of the beam shaping apparatus and the positional shift of the target.

Clause 26. The computer-readable medium of clause 25, wherein the dosimetric property comprises a radiation dose.

Clause 27. The computer-readable medium of clause 25 or clause 26, wherein the instructions, when executed by the one or more processors, further cause the one or more processors to, if the evaluated dosimetric property meets a predetermined dosimetric criterion, adjust the beam shaping apparatus in accordance with the updated configuration of the beam shaping apparatus.

Clause 28. The computer-readable medium of any one of clause 25 to clause 27, wherein the instructions, when executed by the one or more processors, further cause the one or more processors to output a result of the evaluation of the dosimetric property to a user, and to prompt the user to confirm whether to proceed with adjusting the beam shaping apparatus in accordance with the updated configuration of the beam shaping apparatus.

Clause 29. The computer-readable medium of any one of clause 19 to clause 28, wherein the first treatment plan is generated before delivery of the radiation therapeutic beam based on a reference plan.

Clause 30. The computer-readable medium of any one of clause 19 to clause 29, wherein the information indicating the positional shift of the target comprises a longitudinal displacement, a vertical displacement and a transverse displacement of the target.

Clause 31. The computer-readable medium of any one of clause 19 to clause 30, wherein the information indicating the positional shift of the target is based on one or more 2-dimensional slice images.

Clause 32. The computer-readable medium of any one of clause 19 to clause 31, wherein determining the updated configuration of the beam shaping apparatus comprises determining an updated configuration of leaves of a multi-leaf collimator of the beam shaping apparatus and/or an updated configuration of a diaphragm of the beam shaping apparatus.

Clause 33. A controller for controlling a radiotherapy apparatus, the controller configured to:
  obtain a first treatment plan comprising positioning information of a beam shaping apparatus of the radiotherapy apparatus;
  receive, during delivery of a radiation therapeutic beam to a target on a patient, information indicating a positional shift of the target; and
  generating a revised treatment plan based on the first treatment plan, the generating of the revised treatment plan comprising determining an updated configuration of the beam shaping apparatus from the positioning information of the first treatment plan based on the positional shift of the target.

Clause 34. The controller of clause 33, wherein the beam shaping apparatus comprises a multi-leaf collimator (MLC), and wherein the updated configuration of the beam shaping apparatus comprises an updated position of the MLC.

Clause 35. The controller of clause 33 or clause 34, wherein the controller is further configured to determine if the positional shift meets a predetermined condition, and wherein generating the revised treatment plan is performed if the positional shift meets the predetermined condition.

Clause 36. The controller of clause 35, wherein the controller is further configured to, if the positional shift does not meet the predetermined condition, terminate the delivery of the radiation therapeutic beam.

Clause 37. The controller of clause 35 or clause 36, wherein the predetermined condition comprises the positional shift being less than or equal to a threshold shift amplitude.

Clause 38. The controller of any one of clause 33 to clause 36, wherein the controller is further configured to adjust the beam shaping apparatus according to the determined updated configuration of the beam shaping apparatus.

Clause 39. The controller of any one of clause 33 to clause 38, wherein the controller is further configured to evaluate a dosimetric property based at least in part on the updated configuration of the beam shaping apparatus and the positional shift of the target.

Clause 40. The controller of clause 39, wherein the dosimetric property comprises a radiation dose.

Clause 41. The controller of clause 39 or clause 40, wherein the controller is further configured to, if the evaluated dosimetric property meets a predetermined dosimetric criterion, adjust the beam shaping apparatus in accordance with the updated configuration of the beam shaping apparatus.

Clause 42. The controller of any one of clause 39 to clause 41, wherein the controller is further configured to output a result of the evaluation of the dosimetric property to a user, and to prompt the user to confirm whether to proceed with adjusting the beam shaping apparatus in accordance with the updated configuration of the beam shaping apparatus.

Clause 43. The controller of any one of clause 33 to clause 42, wherein the first treatment plan is generated before delivery of the radiation therapeutic beam based on a reference plan.

Clause 44. The controller of any one of clause 33 to clause 43, wherein the information indicating the positional shift of the target comprises a longitudinal displacement, a vertical displacement and a transverse displacement of the target.

Clause 45. The controller of any one of clause 33 to clause 44, wherein the information indicating the positional shift of the target is based on one or more 2-dimensional slice images.

Clause 46. The controller of any one of clause 33 to clause 45, wherein determining the updated configuration of the beam shaping apparatus comprises determining an updated configuration of leaves of a multi-leaf collimator of the beam shaping apparatus and/or an updated configuration of a diaphragm of the beam shaping apparatus.

Clause 47. A radiotherapy apparatus comprising the controller of any one of clauses 33 to 46 and a beam shaping apparatus.

What is claimed is:

1. A method for controlling a radiotherapy apparatus, the method comprising:

obtaining a first treatment plan comprising positioning information of a beam shaping apparatus of the radiotherapy apparatus;

receiving, during delivery of a radiation therapeutic beam to a target on a patient, information indicating a positional shift of the target; and generating a revised treatment plan based on the first treatment plan, the generating of the revised treatment plan comprising determining an updated configuration of the beam shaping apparatus from the positioning information of the first treatment plan based on the positional shift of the target, wherein the positioning information of the beam shaping apparatus in the first treatment plan comprises an opening of a multi-leaf collimator defined by a polygon defined by vertices, and wherein determining the updated configuration of the beam shaping apparatus comprises determining an updated polygon by updating the vertices, and wherein the updated vertices are calculated according to the following formula:

$$x_1 = \frac{x_0 \cdot h + \Delta x \cdot H}{h - \Delta z}$$

$$y_1 = \frac{y_0 \cdot h + \Delta y \cdot H}{h - \Delta z}$$

and wherein:

$\Delta x$, $\Delta y$, and $\Delta z$ are calculated from original $\Delta x_0$, $\Delta v_0$, $\Delta z_0$ using linear transformation:

$$\begin{bmatrix} \Delta x \\ \Delta z \\ \Delta y \end{bmatrix} = \begin{bmatrix} \cos\theta & \sin\theta & 0 \\ \sin\theta & -\cos\theta & 0 \\ 0 & 0 & 1 \end{bmatrix} \begin{bmatrix} \Delta x_0 \\ \Delta y_0 \\ \Delta z_0 \end{bmatrix}.$$

2. The method of claim 1, wherein the beam shaping apparatus comprises a multi-leaf collimator (MLC), and wherein the updated configuration of the beam shaping apparatus comprises an updated position of the MLC.

3. The method of claim 1, further comprising:
determining whether the positional shift meets a predetermined condition, wherein generating the revised treatment plan is performed when the positional shift meets the predetermined condition.

4. The method of claim 3, wherein when the positional shift does not meet the predetermined condition, the method comprises terminating the delivery of the radiation therapeutic beam.

5. The method of claim 3, wherein the predetermined condition comprises the positional shift being less than or equal to a threshold shift amplitude.

6. The method of claim 1, further comprising:
adjusting the beam shaping apparatus according to the determined updated configuration of the beam shaping apparatus.

7. The method of claim 1, further comprising:
evaluating a dosimetric property based at least in part on the updated configuration of the beam shaping apparatus and the positional shift of the target.

8. The method of claim 7, wherein the dosimetric property comprises a radiation dose.

9. The method of claim 7, further comprising:
when the evaluated dosimetric property meets a predetermined dosimetric criterion, adjusting the beam shaping apparatus in accordance with the updated configuration of the beam shaping apparatus.

10. The method of claim 7, further comprising:
outputting a result of the evaluation of the dosimetric property to a user; and
prompting the user to confirm whether to proceed with adjusting the beam shaping apparatus in accordance with the updated configuration of the beam shaping apparatus.

11. The method of claim 1, wherein the first treatment plan is generated before delivery of the radiation therapeutic beam based on a reference plan.

12. The method of claim 1, wherein the information indicating the positional shift of the target comprises a longitudinal displacement, a vertical displacement and a transverse displacement of the target.

13. The method of claim 1, wherein the information indicating the positional shift of the target is based on one or more 2-dimensional slice images.

14. The method of claim 1, wherein the positioning information of the beam shaping apparatus in the first treatment plan comprises an opening of a multi-leaf collimator defined by a polygon, and wherein determining the updated configuration of the beam shaping apparatus comprises determining an updated polygon.

15. A non-transitory computer-readable medium comprising computer-executable instructions that, when executed by a processor of a computing device, cause the processor to:
obtain a first treatment plan comprising positioning information of a beam shaping apparatus of a radiotherapy apparatus;
receive, during delivery of a radiation therapeutic beam to a target on a patient, information indicating a positional shift of the target; and
generate a revised treatment plan based on the first treatment plan, the generating of the revised treatment plan comprising determining an updated configuration of the beam shaping apparatus from the positioning information of the first treatment plan based on the positional shift of the target, wherein the positioning information of the beam shaping apparatus in the first treatment plan comprises an opening of a multi-leaf collimator defined by a polygon defined by vertices, and wherein determining the updated configuration of the beam shaping apparatus comprises determining an updated polygon by updating the vertices, and wherein the updated vertices are calculated according to the following formula:

$$x_1 = \frac{x_0 \cdot h + \Delta x \cdot H}{h - \Delta z}$$
$$y_1 = \frac{y_0 \cdot h + \Delta y \cdot H}{h - \Delta z}$$

and wherein:
$\Delta x$, $\Delta y$, and $\Delta z$ are calculated from original $\Delta x_0$, $\Delta y_0$, $\Delta z_0$ using linear transformation:

$$\begin{bmatrix} \Delta x \\ \Delta z \\ \Delta y \end{bmatrix} = \begin{bmatrix} \cos\theta & \sin\theta & 0 \\ \sin\theta & -\cos\theta & 0 \\ 0 & 0 & 1 \end{bmatrix} \begin{bmatrix} \Delta x_0 \\ \Delta y_0 \\ \Delta z_0 \end{bmatrix}.$$

16. The non-transitory computer-readable medium of claim 15, wherein the instructions further cause the processor to:
determine whether the positional shift meets a predetermined condition, wherein generating the revised treatment plan is performed when the positional shift meets the predetermined condition, wherein when the positional shift does not meet the predetermined condition, delivery of the radiation therapeutic beam is terminated, and wherein the predetermined condition comprises the positional shift being less than or equal to a threshold shift amplitude.

17. The non-transitory computer-readable medium of claim 15, wherein the instructions further cause the processor to:
evaluate a dosimetric property based at least in part on the updated configuration of the beam shaping apparatus and the positional shift of the target, wherein the dosimetric property comprises a radiation dose; and
when the evaluated dosimetric property meets a predetermined dosimetric criterion, adjusting the beam shaping apparatus in accordance with the updated configuration of the beam shaping apparatus.

18. A radiotherapy apparatus comprising:
a beam shaping apparatus; and
a controller to:
obtain a first treatment plan comprising positioning information of the beam shaping apparatus;
receive, during delivery of a radiation therapeutic beam to a target on a patient, information indicating a positional shift of the target; and
generate a revised treatment plan based on the first treatment plan, the generating of the revised treatment plan comprising determining an updated configuration of the beam shaping apparatus from the positioning information of the first treatment plan based on the positional shift of the target, wherein the positioning information of the beam shaping apparatus in the first treatment plan comprises an opening of a multi-leaf collimator defined by a polygon defined by vertices, and wherein determining the updated configuration of the beam shaping apparatus comprises determining an updated polygon by updating the vertices, and wherein the updated vertices are calculated according to the following formula:

$$x_1 = \frac{x_0 \cdot h + \Delta x \cdot H}{h - \Delta z}$$
$$y_1 = \frac{y_0 \cdot h + \Delta y \cdot H}{h - \Delta z}$$

and wherein:
$\Delta x$, $\Delta y$, and $\Delta z$ are calculated from original $\Delta x_0$, $\Delta y_0$, $\Delta z_0$ using linear transformation:

$$\begin{bmatrix} \Delta x \\ \Delta z \\ \Delta y \end{bmatrix} = \begin{bmatrix} \cos\theta & \sin\theta & 0 \\ \sin\theta & -\cos\theta & 0 \\ 0 & 0 & 1 \end{bmatrix} \begin{bmatrix} \Delta x_0 \\ \Delta y_0 \\ \Delta z_0 \end{bmatrix}.$$

19. The radiotherapy apparatus of claim 18, wherein the controller is to:
determine whether the positional shift meets a predetermined condition, wherein generating the revised treatment plan is performed when the positional shift meets the predetermined condition, wherein when the positional shift does not meet the predetermined condition, delivery of the radiation therapeutic beam is terminated, and wherein the predetermined condition comprises the positional shift being less than or equal to a threshold shift amplitude;

evaluate a dosimetric property based at least in part on the updated configuration of the beam shaping apparatus and the positional shift of the target, wherein the dosimetric property comprises a radiation dose; and when the evaluated dosimetric property meets a predetermined dosimetric criterion, adjusting the beam shaping apparatus in accordance with the updated configuration of the beam shaping apparatus.

* * * * *